United States Patent
Kao

(10) Patent No.: US 7,103,259 B1
(45) Date of Patent: Sep. 5, 2006

(54) STRUCTURE FOR AFFIXING AN OPTICAL PLATE ON A FRAME IN A PANEL DISPLAY

(75) Inventor: Ying-Pei Kao, Taoyuan County (TW)

(73) Assignee: Hannstar Display Corporation, Taoyuan (TW)

( * ) Notice: Subject to any disclaimer, the term of this patent is extended or adjusted under 35 U.S.C. 154(b) by 0 days.

(21) Appl. No.: 10/907,104

(22) Filed: Mar. 21, 2005

(51) Int. Cl.
*G02B 6/00* (2006.01)

(52) U.S. Cl. ....................................... 385/147; 385/134

(58) Field of Classification Search ........ 385/134–139, 385/147; 359/822; 403/52; 362/613; 349/58, 349/64, 113
See application file for complete search history.

(56) References Cited

U.S. PATENT DOCUMENTS 6,590,723 B1 * 7/2003 Hodge ........................ 359/822

* cited by examiner

*Primary Examiner*—Phan Palmer
(74) *Attorney, Agent, or Firm*—Jiang Chyun IP Office

(57) ABSTRACT

A structure is to affix an optical plate on a frame in a panel display. The optical plate has a protruding region with a slit. The structure includes a first hook-like member, disposed on one side of the frame and having an extending portion for passing through the slit and hooking the protruding region of the optical plate. A blocking member is disposed on the side of the frame and separated from the first hook-like member, having a sidewall against an edge of the protruding region of the optical plate.

9 Claims, 4 Drawing Sheets

STRUCTURE FOR AFFIXING AN OPTICAL PLATE ON A FRAME IN A PANEL DISPLAY

BACKGROUND OF THE INVENTION

1. Field of Invention

The present invention relates to assembling technology in panel display. More particularly, the present invention relates to a structure for affixing an optical plate, that is, optical film on a frame in a panel display.

2. Description of Related Art

The display is an essential tool to display the information of a graphic image or text image to a viewer. For example, TV shows the image to the user through the display, or the computer system uses the display terminal to show the information in operation. Therefore, the display device is one of the key tools in the daily life to have the information communication. The display device has been developed from the rather conventional cathode-ray tube (CRT) to the panel display, such as liquid crystal display (LCD) device.

The LCD is more and more popular, and the image quality is more and more required. For the LCD device, the optical plate, which is affixed onto a frame, often cause the poor image quality, due to a shift of position. In the currently conventional method, the optical plate is positioned to the plastic frame and then a tape is used to affix it at one side or a clamping piece is used to clamp it to the frame. FIGS. 1A–1E show the conventional structure to affix the optical plate.

In FIG. 1A and FIGS. 1C–1D, the optical plate 100 used in the LCD device usually includes an optical diffusion layer, an optical prism layer, a functional layer, . . . and so on, which are stacked as a flexible optical layer or optical plate. In order to affix the optical plate 100 onto a frame 106, a protruding portion 102 is arranged. The protruding portion 102 has a hole 104, so that the hole 104 can be fitted to a position pin 12 at the frame 106. In FIG. 1B and FIGS. 1C–1D, the affixing structure 90 is formed at a desired location of the frame 106. A portion of the frame 106 is shown in FIG. 1B. The position pin 112 is to engage with the hole 104 of the optical plate 100. The optical plate 100 is indented and is to adapt the protrusion portion 102. After the hole 104 is engaged onto the position pin 112, a tape 114 is used to further affix the optical plate 100 onto the frame at the region 108. In FIG. 1D, from the side view, the conventional affixing mechanism is shown. Also, another method is using the clamping piece as shown in FIG. 1C and FIG. 1E. When the optical plate 100 is positioned to the position pin 104, the clamping piece 116 is used instead of the tape 14.

For the foregoing conventional manners, it has some disadvantages. Due to the limitation of the required size, the region for affixing the optical plate, such as the protrusion portion 102 is quite narrow. And then, during the assembly processes, such as adhering by tape, the tape often cannot firmly affix the optical plate due to the narrow space, and a shift of position may occur, or the optical plate is dropped away. Even, the residue of the glue of the tape may affect the property of the other device element. As result, the image quality is poor. In addition, either by taping or by clamping piece, both the manpower cost and the material cost increase.

SUMMARY OF THE INVENTION

The invention provides a novel affixing structure on the frame, so that the assembly process for affixing the optical plate is easy without using the tape or the clamping piece.

The invention provides a structure to affix an optical plate on a frame in a display device. The optical plate has a protruding region with a slit. The structure includes a first hook-like member, disposed on one side of the frame and having an extending portion for passing through the slit and hooking the protruding region of the optical plate. A blocking member is disposed on the side of the frame and separated from the first hook-like member, having a sidewall against an edge of the protruding region of the optical plate.

In another aspect of the present invention, the frame with the affixing structure is formed by molding manner, so as to form an integrated body for the frame.

In another aspect of the present invention, a top surface of the blocking member is slant and has an extending portion toward the first hook-like member.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the present invention, a hook-like structure is designed for the frame, so that the assembly process is simplified, and the optical plate can be easily affixed to the frame without using tape or clamping piece.

Figure 2:
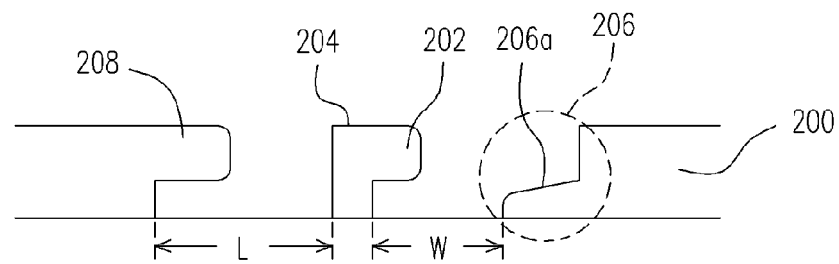
FIG. 2 is a cross-sectional view, schematically illustrating an affixing structure on the frame, according to a preferred embodiment of the invention.
Figure 3:
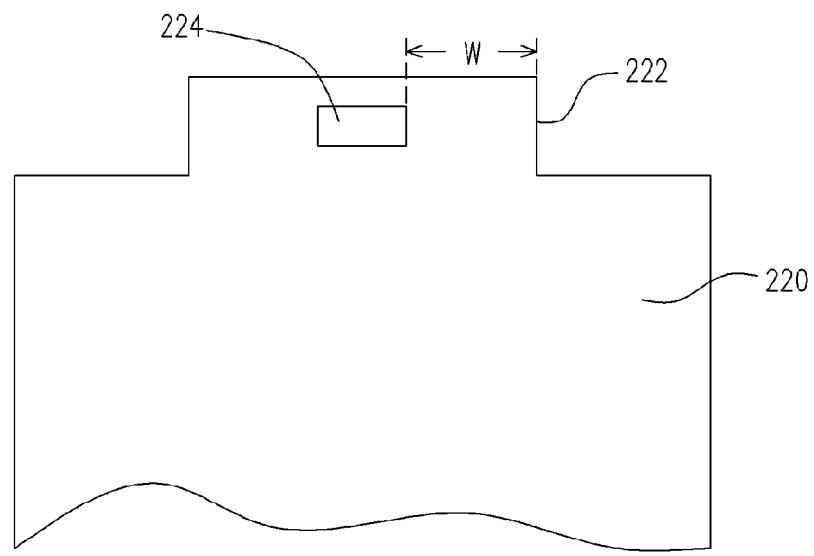
FIG. 3 is a top view, schematically illustrating a portion of an optical plate 220 with a protrusion region, according to the preferred embodiment of the invention.

FIG. 2 is a cross-sectional view, schematically illustrating an affixing structure on the frame, according to a preferred embodiment of the invention. FIG. 3 is a top view, schematically illustrating an optical plate affixed to the frame by the affixing structure according to the preferred embodiment of the invention.

In FIG. 2, the affixing structure disposed on one side of the frame 200 includes a first hook-like member 204, a second hook-like member 208, and a blocking member 206. The first hook-like member 204 has an extending portion 202 and has an adapting space between the frame 200, which is substantially equal to a thickness of an optical plate 220, so as to firmly affix the optical plate 220 when it is inserted in. The second hook-like member 208 also has an extending portion toward the first hook-like member 204 and also has an adapting space between the frame 200, which is substantially equal to a thickness of an optical plate 220. The second hook-like member 208 is separated from the first hook-like member 204 by a distance L. The quantity of the distance L is choice depending on the size of a protrusion region 222 of the optical plate 220, as to be described later. Then, the blocking member 206 is separated from the second hook-like member 208 by a distance W, and the first hook-like member 204 is positioned between the second hook-like member 208 and the blocking member 206. The blocking member 206 may have a slightly slant top surface 206a, which is helpful for loading the optical plate 220, as can be realized later. It should be noted that, the distance W is also a design choice depending on the structure of the protrusion region 222 of the optical plate 220.

In FIG. 3, the optical plate 220 has at least one protrusion region 222, protruding from the side. The protrusion region 222 is located at the desired position for affixing the optical plate 200. In order to engage with the affixing structure on the frame 200 in FIG. 2, the protrusion region 222 has slit 224, and the extending portion 202 of the first hook-like member 204 is passing through the slit 224 for hooking the protruding region 222. However, the distance of an end of the slit 224 and an edge of the protrusion region 222, preferably, also has the distance W. This effect can be seen in FIG. 4.

Figure 4:
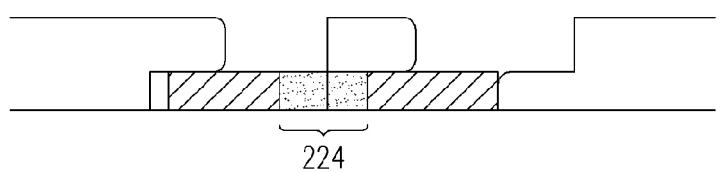
FIG. 4 is a cross-sectional view, schematically illustrating the affixing mechanism, according to the preferred embodiment of the invention.

FIG. 4 is a cross-sectional view, schematically illustrating the affixing mechanism, according to the preferred embodiment of the invention. The protrusion region 222 in shaded region of the optical plate 220 is inserted into the first hook-like member 204 through the slit 224, and then is shifted into the adapting space. Here, if the top surface 206a of the blocking member 206 is in slightly slant, then it is helpful to shift the protrusion region 222 into the adapting space. However, the slant top surface 206a is not the necessary requirement. As mention above, due to the distance W, the protrusion region 222, having an edge against a sidewall of the blocking member 206, is automatically confined between the first hook-like structures 204 and the blocking member 206. However, the distance L is sufficiently large to load the protrusion region 222 of the optical plate 220.

Due to both the first hook-like structures 204 and the second hook-like structures 208 having the extending member, the protrusion region 222 of the optical plate 220 can be affixed on the frame. The adapting space between the first hook-like member 204 and the frame 200 and the adapting space between the second hook-like member 208 and the frame 200 are substantially equal to the thickness of the optical plate 220, so as to firmly adapt the optical plate 220. As a result, the optical plate 220 does not drop away. The present invention needs no tapes to affix the optical plate onto the frame. The conventional issues, such as drop or glue residue, caused by the tape manner can be effectively reduced.

In addition, due to the well fit of the distance W, the optical plate 220 can be prevented from shifting along the direction parallel to the slit 224. Also, the width of the slit 224 is mated to the width of the first hook-like member 204. As a result, the optical plate 220 is prevented from shifting along the direction perpendicular to the slit 224. Thus, the optical plate 220 is affixed in three-dimensional directions. This can further reduce the possibility of poor image quality. In other words, the quantities of the distance L and W are the design choice according to the design of the protrusion region 222 of the optical plate 220. The lengths of the extending portions of the two hook-like members 204 and 208 can also be varied, so as to firmly hook the optical plate 220.

During assembly process, after the optical plate is engaged into the foregoing affixing structure, the assembly piece may be moved to other place for the subsequent assembly process. In this stage, the optical plate may drop due to external force in transporting or shipment, the present invention provide another embodiment to improving the affixing capability.

Figure 5:
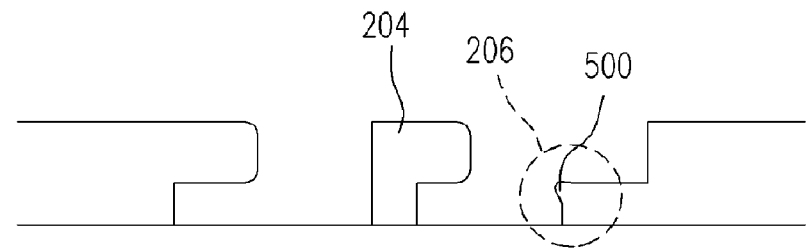
FIG. 5 is a cross-sectional view, schematically illustrating an affixing structure on the frame, according to another preferred embodiment of the invention.

FIG. 5 is a cross-sectional view, schematically illustrating an affixing structure on the frame, according to another preferred embodiment of the invention. The basic structure of the embodiment in FIG. 5 is similar to the structure in FIG. 2. The difference is that the top surface of the blocking member 206 has additional extending portion 500, such as a tip, toward the first hook-like member 204. Therefore, the additional extending portion 500 can improve the affixing capability to prevent the optical plate from dropping.

Figure 6:
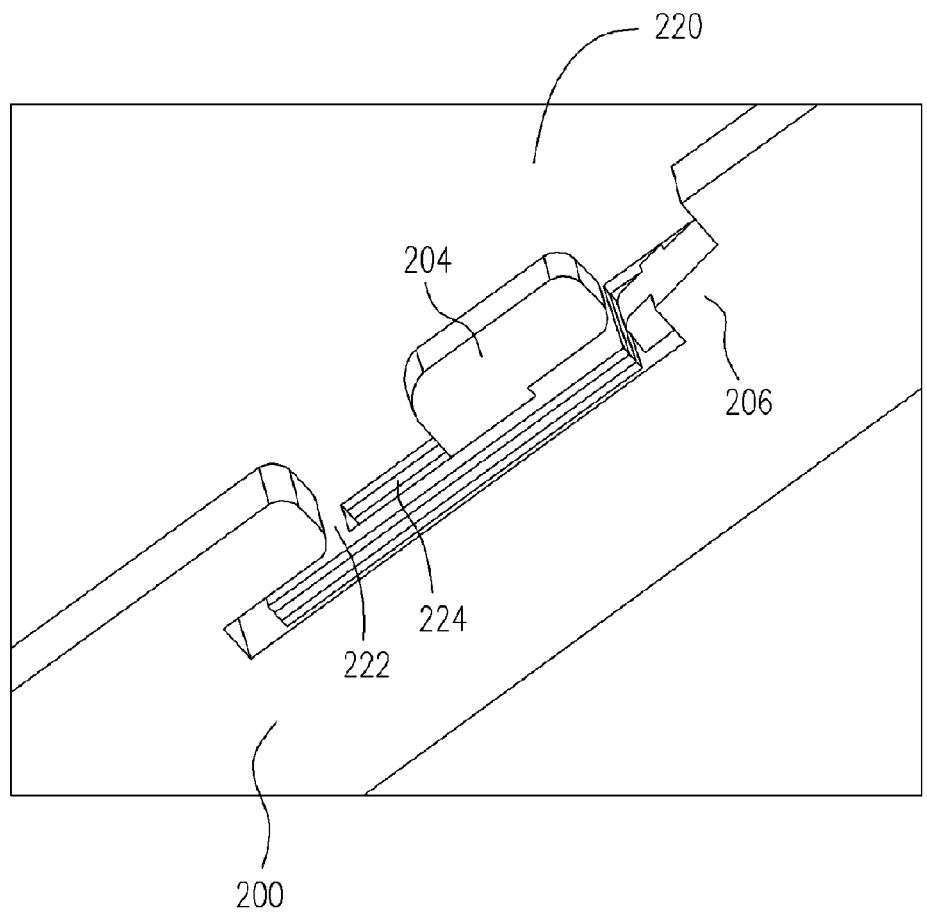
FIG. 6 is a perspective view, schematically illustrating the loading structure, according to one preferred embodiment of the invention.

FIG. 6 is a perspective view, schematically illustrating the loading structure, according to one preferred embodiment of the invention. In FIG. 6, the optical plate 220 is, for example, composed by three stack layers, such as the diffusion plate, the prism plate, and another function layer. The protrusion region 222 has the slit 224 for allowing the optical plate 220 to be loaded onto the frame 200. The blocking member 206 has the slant top surface in the drawing. This is helpful to load the optical plate 220 onto the frame 200.

Figure 1A:
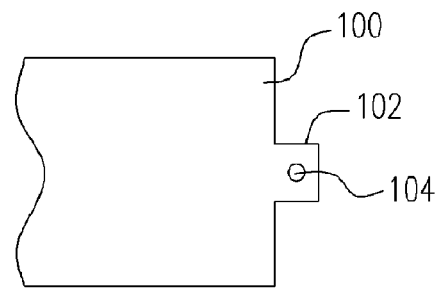
FIGS. 1A–1E are drawings, schematically illustrating the conventional structure to affixing an optical plate onto a frame of LCD.
Figure 1B:
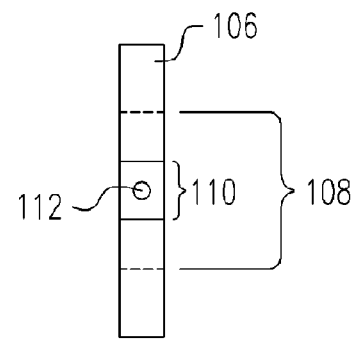
Figure 1C:
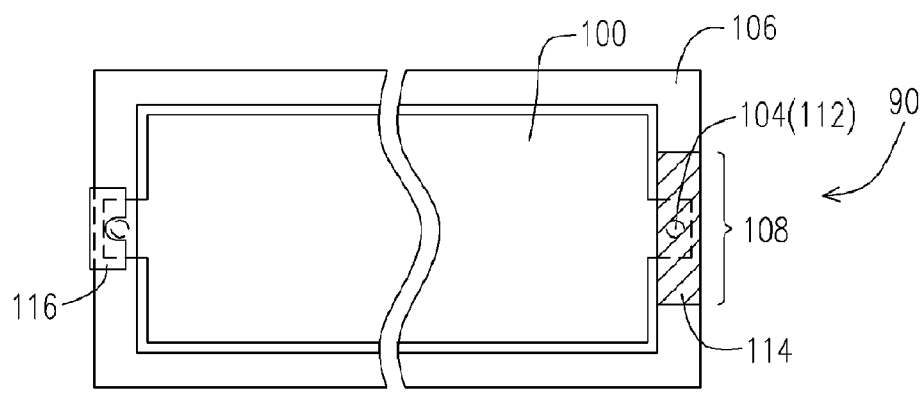
Figure 1D:
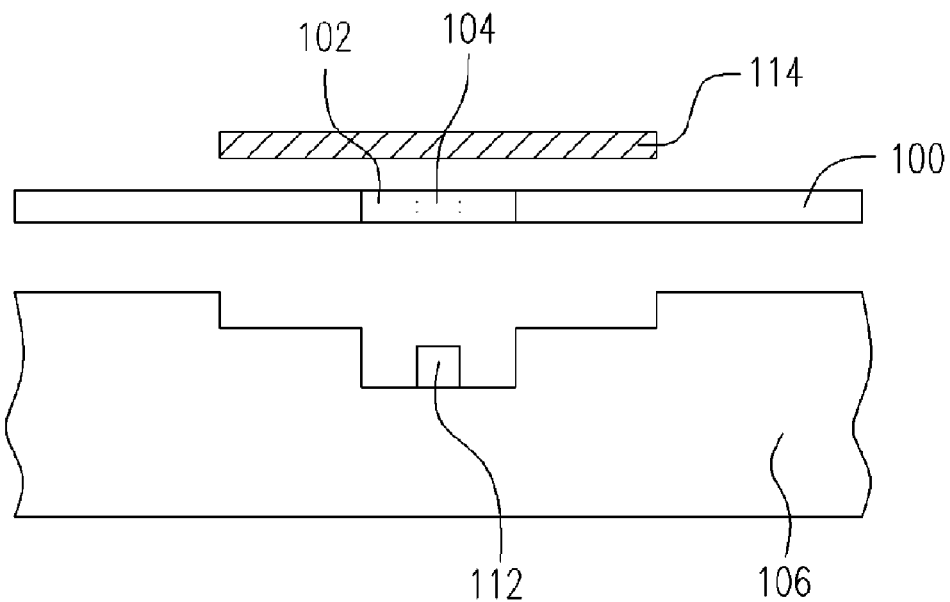
Figure 1E:
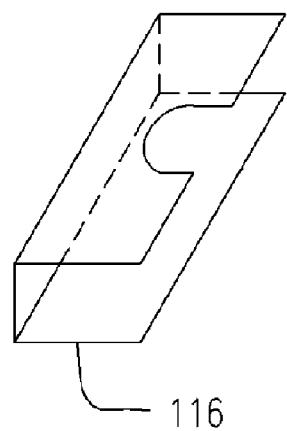

Due to the design of the present invention, the affixing structure is a part of the frame 200 and can be formed by for example molding manner. In other words, the manufacturer can modify the molding structure for forming the frame 200, and the affixing structure can be easily formed as an integrated single body. The frame 200 can be a rectangular or square shape as shown in FIG. 1C. Alternatively, the fame 200 can be just a bar at one side. This depends on how to design the frame 200. However, the frame 200 may include at least one affixing structure of the present invention.

Generally, the affixing structure of the present invention can be applied to the display device, for example, an LCD device. The display device comprises a liquid crystal display panel for displaying image and a backlight for providing light to the liquid crystal display panel. The backlight at least comprises an optical plate assembled onto a frame. The frame preferably has affixing structure as described above of the present invention. Then, the flexible optical plate is affixed onto the frame using the affixing structure. The affixing structure of the present invention can be used together with another conventional affixing manner.

The present invention provides the hooking manner design for simultaneously affixing the optical pate and positioning the optical plate. The fabrication method for the frame is compatible with the conventional molding manner. The present invention can be easily applied. The fabrication cost is further reduced.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A structure for affixing an optical plate on a frame in a panel display, wherein the optical plate has at least one protruding region with a slit, the structure comprising:

a first hook-like member, disposed on one side of the frame, having an extending portion for passing through the slit and hooking the protruding region of the optical plate; and a blocking member, disposed on the side of the frame and separated from the first hook-like member, having a sidewall against an edge of the protruding region of the optical plate.

2. The structure of claim 1 further comprises a second hook-like member, and the first hook-like member is positioned between the blocking member and the second hook-like member.

3. The structure of claim 2, wherein the second hook-like member has an extending portion toward the first hook-like member.

4. The structure of claim 3, wherein an adapting space is between the extending portion of the second hook-like member and the frame and is substantially equal to a thickness of the optical plate.

5. The structure of claim 1, wherein a top surface of the blocking member has an extending portion toward the first hook-like member.

6. The structure of claim 1, wherein the optical plate comprises an optical diffusion plate, a prism plate, or a functional optical plate used in the panel display.

7. The structure of claim 1, wherein the optical plate is stacked with at least two flexible layers.

8. The structure of claim 1, wherein an adapting space is between the extending portion of the first hook-like member and the frame and is substantially equal to a thickness of the optical plate.

9. The structure of claim 1, wherein the blocking member has a slant top surface.

* * * * *